United States Patent Office 3,514,435
Patented May 26, 1970

3,514,435
POLYMERIZATION OF DIVINYL ACETALS
Alan E. Ardis, North Haven, Heinz J. Dietrich, Bethany, Maurice A. Raymond, Northford, and Venkataramaraj S. Urs, Cheshire, Conn., assignors to Olin Mathieson Chemical Corporation
No Drawing. Filed Mar. 6, 1967, Ser. No. 620,662
Int. Cl. C08f 3/38
U.S. Cl. 260—91.1  7 Claims

ABSTRACT OF THE DISCLOSURE

A process for preparing polydivinyl acetals having molecular weights of from about 5000 to about 500,000 in which the corresponding divinyl acetals are polymerized in the presence of a trialkyl boron compound and oxygen at temperatures ranging from about $-100$ to about $+30°$ C.

---

This invention relates to a process for the polymerization of divinyl acetals. More particularly, this invention relates to a process for the polymerization of divinyl acetals in the presence of a trialkyl boron compound and oxygen or a free oxygen-containing gas.

Commercially, polyvinyl acetals, such as polyvinyl formal and polyvinyl butyral, are made by condensing polyvinyl-alcohol with an aldehyde such as formaldehyde or butyraldehyde respectively. Polyvinyl acetals made from polyvinyl alcohol and an appropriate aldehyde, contain besides acetal groups, also hydroxyl groups that escaped condensation with the aldehyde and, in addition, acetate groups that escaped hydrolysis during the manufacture of the polyvinyl alcohol from polyvinyl acetate.

By the method of this invention polydivinyl acetals are prepared in an economic, one-stage process by inter-intramolecular cyclopolymerization of the corresponding divinyl acetals as shown below:

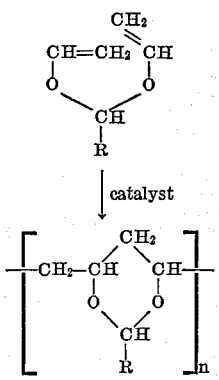

wherein R is hydrogen, alkyl of from 1 to 10 carbon atoms or aryl of not more than 8 carbon atoms, and $n$ is an integer of such value that the molecular weight of the polymers vary from about 5000 to about 500,000. From nuclear magnetic resonance studies it has been determined that some branching takes place within the structural units. One postulated branched chain structure is as follows:

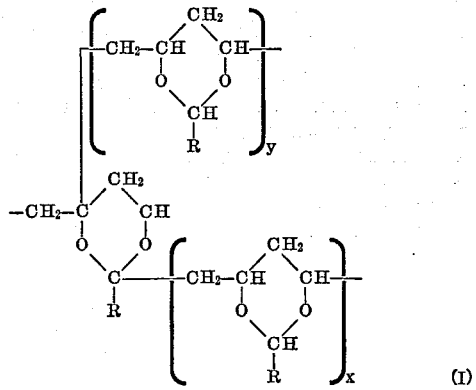

where $x$ and $y$ denote the number of repeating units and R has the same meaning as previously described. Further, small amounts of branched chain units of the following formula may also be formed during the polymerization reaction of this invention:

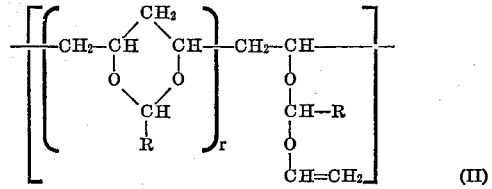

where $r$ represents the number of repeating units and R has the same meaning as previously described.

The softness of the polymers prepared by the process of this invention to touch and the high degree of elongation exhibited by these materials (i.e., from about 100 to 200 percent) may be attributed to the absence of hydroxyl groups and to the presence of branched structures of the type exemplified by I and II above. Such properties are important in applications where the polydivinyl acetals are used as flexible adhesives for flexible substrates such as plastic films, leather and in the construction of shoes.

Since the polydivinyl acetal described above are more hydrophobic than conventional polymers which contain as high as about 20 percent of free hydroxyl groups they are especially useful in applications where free hydroxyl groups cannot be tolerated, such as isocyanate terminated prepolymer compositions containing polyvinyl acetals as flow control agents.

Polymerization of divinyl acetals in the presence of azobisisobutyronitrile and under the influence of ultraviolet light has been described by Matsoyan and co-workers (Vysokomol. soedin. 3, 562–9 (1961)); 4, 882–4 (1962), and by Arbuzova et al. (Vyosokomol. soedin. 2, 1077–81 (1960)), yield soluble polymers with intrinsic viscosities varying from 0.10 to 0.42 corresponding to molecular weights of less than about 30,000. Attempts to prepare polymers by the prior art methods have yielded, in the polymerization of divinyl formal catalyzed by benzoyl peroxide or azobisisobutyronitrile at 50°–80° C., only cross-linked, insoluble polymers (Chemical Abstracts 57, 4850) or, in the case of divinyl butyral, the resulting polymers were of low molecular weight.

Divinyl acetals, as prepared, contain several impurities in trace quantities which, it has been found, play a very detrimental part in restricting the molecular weights of the polymers. Small amounts of aldehydes and other impurities (about 0.2 to about 0.4 percent by weight) are generally found even in the freshly distilled acetal monomers and these compounds lower the molecular weights of the polymers by acting presumably as chain-transferring agents. It has been found that highly-purified monomers, that is, divinyl acetals having a carbonyl group content of not more than 0.10 percent by weight yield polyvinyl acetals with molecular weights as high as 500,000. Preferably, in the process of this invention the divinyl acetals utilized as monomers have a carbonyl group content of not more than 0.10 percent by weight.

One method of purification is to first admix the divinyl acetal with aniline, reflux the mixture for two hours or more and then distill the divinyl acetal, under reduced pressure, through a packed or spinning-band fractionating column. Generally, the amount of aniline employed will vary from about 0.1 to about 5 weight percent based on the weight of the divinyl acetal. For example, divinyl butyral purified by this procedure exhibited a carbonyl group content (as indicated by infra-red absorption at 5.8 microns, as well as a quantitative estimation by using the method of Mayes, Kuchar and Siggia, Anal. Chem. 36, 934 (1964)) of less than 0.05 percent.

Higher molecular weight polymers, up to 500,000 or more have been obtained, for example, by refluxing, once distilled, divinyl butyral (B.P. 142° C.) over calcium hydride (0.2 to 0.5 percent by weight based on the weight of the divinyl butyral) for 2 to 5 hours or more and following which the divinyl butyral is distilled into a vessel containing an alkali metal benzophenone ketyl (0.2 to 0.5 percent by weight based on the weight of divinyl butyral). This mixture is then refluxed until a blue color develops, indicating destruction of all hydroxylic and aldehyde impurities in the monomer. Finally, the purified divinyl butyral is distilled from the flask and recovered as the overhead product. This same purification process is applicable to the other divinyl acetals. In preparing the highly purified divinyl acetal as described above, all distilling and refluxing steps are carried out under reduced pressure and at a temperature not exceeding 80° C. Instead of calcium hydride, sodium borohydride or lithium aluminum hydride may be used in an amount equal to about 0.2 to about 0.5 percent by weight based on the weight of the divinyl acetal. Useful alkali metal benzophenone ketyls include, for example, sodium, lithium and potassium benzophenone ketyls. Also in place of the alkali metal benzophenone ketyls, lithium alkyls, such as triethyl aluminum, methyl dipropyl aluminum, tributyl aluminum, etc. and Grignard reagents, such as ethyl magnesium iodide, etc. may be employed. Distillation at atmospheric pressures appears to introduce aldehyde and alkenyl vinyl ether-type impurities through incipient thermal degradation of the divinyl acetal.

Any of a wide variety of other purification methods known to the art may be employed in preparing purified divinyl acetals, such as the use of vapor phase chromatographic fractionation, molecular sieves, anion exchange resins, etc.

The polymer molecular weight referred to in this specification were calculated from Staudinger's equation: $[\eta]=KM^a$, where $[\eta]$ is the intrinsic viscosity of the polymer in benzene at 25° C., K and $\alpha$ are constants, being $8.97 \times 10^{-4}$ and 0.606 respectively, and M is the molecular weight.

It has been found that divinyl acetals can be polymerized in the presence of a trialkyl boron and oxygen or a free oxygen-containing gas to yield polymers having molecular weights of from about 5000 to about 500,000. It is believed that the oxygen combines with the trialkyl boron to form, in situ, a trialkyl boron-oxygen complex which functions as the catalyst. The polymerization of divinyl acetals using such trialkyl boron-oxygen complex catalysts can be carried out at temperatures ranging from about −100° C. to about +30° C. in bulk, solution, suspension or by the emulsion technique. Solution polymerization at low temperatures is particularly suitable for divinyl formal and divinyl ethanol, which, in the bulk polymerization method, have a greater tendency to give cross-linked polymers. When solution polymerization is practiced, solvents such as dioxane, tetrahydrofuran, methyl ethyl ketone, benzene, etc. can be utilized. Suspension polymerization provides a medium for easy dissipation of heat of polymerization and thereby enabling the polymerization to proceed at a desired constant temperature. It is well-known that, in the overall scheme, the mechanics of the suspension polymerization is identical with that of bulk polymerization.

The emulsion polymerization technique enables the direct preparation of latices of polydivinyl acetals, while the conventional method (from polyvinyl alcohol and aldehyde) would require an indirect method of dispersing a solid polymer in water to give a latex. The latices of this invention may be used in coatings and in adhesives.

Temperatures lower than ambient, when used for polymerization of divinyl acetals by the process of this invention, particularly divinyl butyral, have led to polymers with a certain amount of crystallinity as indicated by measurement of melting point, density and X-ray diffraction pattern of the polymers. The lower the temperature of polymerization, the higher the crystalline fraction and the higher the softening point of the polymer as observed under crossed Nicols prisms. The amorphous polymers exhibit softening points of about 80°–90° C. and densitites ranging from about 1.04 to about 1.08 while the polymers with a crystalline fraction have softening points of about 100° to 130° C. and densities of from about 1.12 to 1.17. The polymers prepared at low temperatures possess superior mechanical properties.

Preferably, the polymerization reaction of invention is carried out at atmospheric pressure although pressures ranging from subatmospheric up to +10 atmospheres or more can be utilized, if desired.

Trialkyl boron compounds useful in the process of this invention include those of the formula:

$$R_3B$$

where R is alkyl of from 2 to 7 carbon atoms as exemplified by triethyl boron, tri-isopropyl boron, dipropyl-n-butyl boron, diethyl isobutyl boron, triamyl boron, di-isohexyl n-butyl boron, triheptyl boron, etc. The quantity of the trialkyl boron employed will generally be from about 0.001 to about 0.1 mole per mole of the divinyl acetal charged to the reactor.

As previously pointed out an essential part of the process of this invention is that the reaction must be conducted in the presence of oxygen or a free oxygen-containing gas. The quantity of oxygen or free oxygen-containing gas may be supplied initially in a single charge to the reactor or it may be added intermittently or continuously to the reaction zone. Continuous addition of oxygen has the added advantage of providing control over the rate of polymerization. Usually from about 0.02 to about 2 moles of oxygen per mole of trialkyl boron and preferably from about 0.1 to about 1 mole of oxygen per mole of trialkyl boron will be employed.

Monomers that may be used to prepare the high molecular weight, soluble, linear polydivinyl acetals by the process of this invention are divinyl formal, divinyl acetal, divinyl propional, divinyl butyral, divinyl isobutyral, divinyl hexanal, divinyl isohexanal, divinyl heptanal, divinyl octanal, etc., divinyl benzal, divinyl methyl benzal, divinyl ethyl benzal and similar divinyl aromatic acetals, and divinyl ketals from acetone and cyclic ketones, for example, divinyl cyclohexanal. The divinyl acetal starting materials can be prepared by the method of Tolbert as set forth in U.S. 3,285,969 or by the process of Coffman as described in U.S. 2,374,078. For example, divinyl butyral can be prepared by dehydrochlorinating di(2 - chloroethyl) butyral at 220° C. in the presence of potassium hydroxide.

The polymers prepared by the process of this invention can be formed by molding, casting, extruding, etc. These polyvinyl acetals which are useful for the preparation of plastics, films, coatings, adhesives, etc. may be combined with fillers, pigments, plasticizers, dyes, oils, material resin, etc. Also the compositions of this invention are useful as impregnating materials for leather, glass, paper, etc.

The following examples illustrate the invention and are to be considered not limitative:

Example I

Into a one-liter, 3-necked flask, equipped with a mechanical stirrer, thermometer, rubber septum (sampling port) and argon inlet and outlet tubes, and cooled to −8° C. there was introduced 500 g. of divinyl butyral having a carbonyl group content of 0.05 percent by weight. Purification was accomplished by admixing the divinyl butyral with about 20 ml. of aniline, refluxing the mixture for about two hours and then distilling the divinyl acetal, under reduced pressure through a spinning band fractionating column. The monomer was degassed by alternately evacuating and repressurizing the flask with argon following which tri-n-butyral boron (2 ml.) was introduced into the reactor. In the next step, oxygen (190 ml. at 25° C. and 760 mm. pressure) was introduced into the reaction mixture over a period of two minutes from a syringe. An increase in viscosity was noticed within an hour indicating that polymerization had started. After twenty-four hours of reaction, 10 ml. of ammonium hydroxide was introduced into the reaction mixture to destroy the residual catalyst and then the mixture was added to methanol (2000 ml.) to precipitate the polymer. The polymer was filtered, washed several times with methanol to remove unreacted monomer and dried in a vacuum oven at 40° C. Intrinsic viscosity of the polymer in benzene at 25° C. was 0.41 and the molecular weight, as calculated from the equation $[\eta]=8.97\times10^{-4}M^{0.606}$, was 25,000. X-ray diffraction patterns of this polymer indicated that it was partly crystalline.

Examples II and III

Two additional examples in which divinyl butyral was polymerized in the presence of tri-n-butyl boron and oxygen were conducted in the same manner as Example I and with the same apparatus. The experimental details of these two examples are summarized below:

| | Divinyl butyral, moles | Tri-n-butyl boron, moles | Oxygen, moles | Polymerization Temp., ° C. | Intrinsic viscosity [3] | Mol. weight |
|---|---|---|---|---|---|---|
| Example No.: | | | | | | |
| II | [1] 3.5 | 0.009 | 0.009 | 0 | 0.36 | 19,500 |
| III | [2] 3.5 | 0.009 | 0.009 | 25 | 0.58 | 43,000 |

[1] Carbonyl group content 0.020 percent.
[2] Carbonyl group content <0.01 percent.
[3] As determined in benzene at 25° C.

Example IV

Into the vessel described in Example I there was introduced 200 ml. of pure benzene and 185 g. of divinyl formal purified as in Example I. The contents were cooled to 0° C. following which 0.001 mole each of tri-n-butyl boron and oxygen were added to the reaction vessel. After twenty-four hours, the polymer formed was precipitated with methanol as in Example I and isolated. The molecular weight of the polymer was 14,074.

Example V

A quantity of divinyl butyral was purified by distillation under reduced pressure from calcium hydride and sodium benzophenone ketyl as described in Example I. The purified divinyl butyral (2351 g.) which had a carbonyl concentration of 0.002 percent by weight was charged into a five liter, three-necked flask and cooled to −50° C. under a purge of argon. Tri-n-butyl boron (3.96 g.) and 520 cc. of oxygen (at 25° C. and 760 mm. Hg) were then charged into the flask. After being stirred for 27 hours a second catalyst charge consisting of 3.96 g. of tri-n-butyl boron and 520 cc. of oxygen (25° C. and 760 mm. Hg) was introduced into the flask and stirring was continued for an additional 16 hour period. The polymerization reaction was then terminated by the addition of 4 g. of hydroquinone after which the reaction mixture was poured into a vessel containing methanol with sufficient potassium hydroxide to maintain the pH at about 8 to precipitate the polymer. The polymer was recovered by filtration and dried. Yield: 377 g. or 16 percent of theoretical; molecular weight 17,500, softening point 125° C. The X-ray diffraction pattern of this polymer indicated partial crystallinity.

The lap shear adhesion of this polyvinyl butyral polymer to stainless steel was 1740 p.s.i. A similar polymer prepared at 140° C. exhibited a lap shear adhesion to stainless steel of 347 p.s.i.

Example VI

A total of 500 g. of divinyl butyral was purified by allowing it to stand at room temperature for 18 hours over 5 g. of aniline and then distilling the mixture through a 40 plate, spinning-band column. The resulting divinyl butyral contained 0.013 percent by weight of carbonyl group content. The purified monomer (173 g.) was polymerized in a three-necked flask under argon at 0° C. using 0.6 cc. of tri-n-butyl boron and 16 cc. (at 25° C. and 760 mm. Hg) of oxygen. After 18 hours, about 5 cc. of aqueous ammonium hydroxide was added to the reaction mixture to terminate the reaction. Recovery of the polymer after precipitation in methanol gave 31 g. of polyvinyl butyral (mol. wt. 62,000) which had a tensile strength of 1900 p.s.i. compared to 810 p.s.i. for a similar polymer (mol. wt. 43,500) prepared at 30° C.

Example VII

Divinyl butyral (100 g.) purified by fractional distillation at atmospheric pressure (B.P. 142° C.) was charged into equipment similar to that described in Example V. The monomer was not specially treated to reduce the carbonyl group concentration. To the reactor there was added 1.6 ml. of tri-n-butyl boron and 150 ml. of oxygen at 25° C. and 760 mm. Hg pressure. Polymerization was allowed to continue for 24 hours at 0° C. after which the polymer was precipitated with methanol and isolated. The molecular weight of this material was 7,500 and its intrinsic viscosity was 0.195 in benzene at 25° C.

What is claimed is:

1. A process for preparing a homopolymer of polydivinyl acetal having a molecular weight, calculated from Staudinger's equation of from about 5000 to about 500,000 which comprises polymerizing purified divinyl acetal having a carbonyl group content of not more than 0.10 percent by weight in the presence of from about 0.001 to about 0.1 mole of a trialkyl boron compound per mole of said divinyl acetal and in the presence of a material selected from the group consisting of oxygen and a free oxygen-containing gas, said material providing from about 0.02 to about 2 moles of oxygen per mole of trialkyl boron at a temperature ranging from about −100° C. to +30° C., the said divinyl acetal having the formula:

$$CH_2=CH-O-CH-O-CH=CH_2$$
$$|$$
$$R$$

wherein R is selected from the group consisting of hydrogen, alkyl of from 1 to 10 carbon atoms and aryl of not more than 8 carbon atoms, and the said trialkyl boron compound having the formula:

$$R_3B$$

wherein R is alkyl of from 2 to 7 carbon atoms.

2. The process of claim 1 wherein the said trialkyl boron compound is tri-n-butyl boron.

3. The process of claim 1 wherein the said material is oxygen.

4. The process of claim 1 wherein the said divinyl acetal is divinyl formal.

5. The process of claim 1 wherein the said divinyl acetal is divinyl butyral.

6. The process of claim 1 wherein the said trialkyl boron compound is tri-n-butyl boron, the said material is oxygen and the said divinyl acetal is divinyl formal.

7. The process of claim 1 wherein the said trialkyl boron compound is tri-n-butyl boron, the said material is oxygen and the said divinyl acetal is divinyl butyral.

References Cited

UNITED STATES PATENTS 2,487,879  11/1949  Kenyon et al. _____ 260—91.1
3,169,947  2/1965  Stroh et al.

OTHER REFERENCES

Bawn et al.: Chem. Abs. 54 (1960), p. 12642e.
Matsoyan: Chem. Abs. 55 (1961), p. 7900f.
Arbuzova et al.: Chem. Abs. 55 (1961), p. 8921i.
Matsoyan et al.: Chem. Abs. 56 (1962) p. 7498i.
Sultanov et al.: Chem. Abs. 59 (1963), p. 4043c.

HARRY WONG, JR., Primary Examiner

U.S. Cl. X.R.

117—138.8, 142, 155, 124, 132; 260—88.3, 80.3, 73, 29.6, 616